May 26, 1931. E. D. SULLIVAN 1,806,719
COMBINATION TONGUE AND BRAKE
Filed Jan. 4, 1929 2 Sheets-Sheet 2
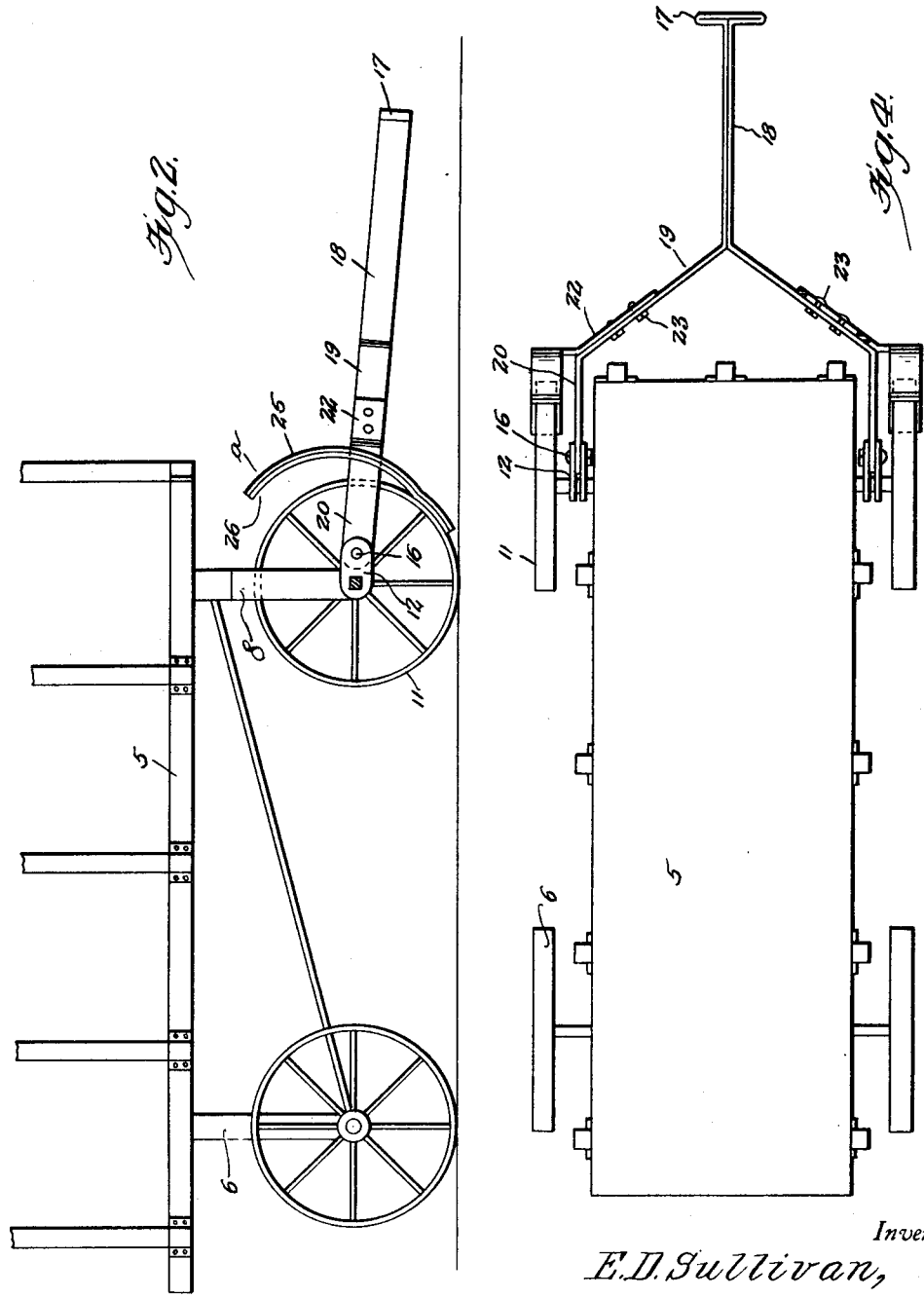
Inventor
E. D. Sullivan,
By Clarence A. O'Brien
Attorney Patented May 26, 1931

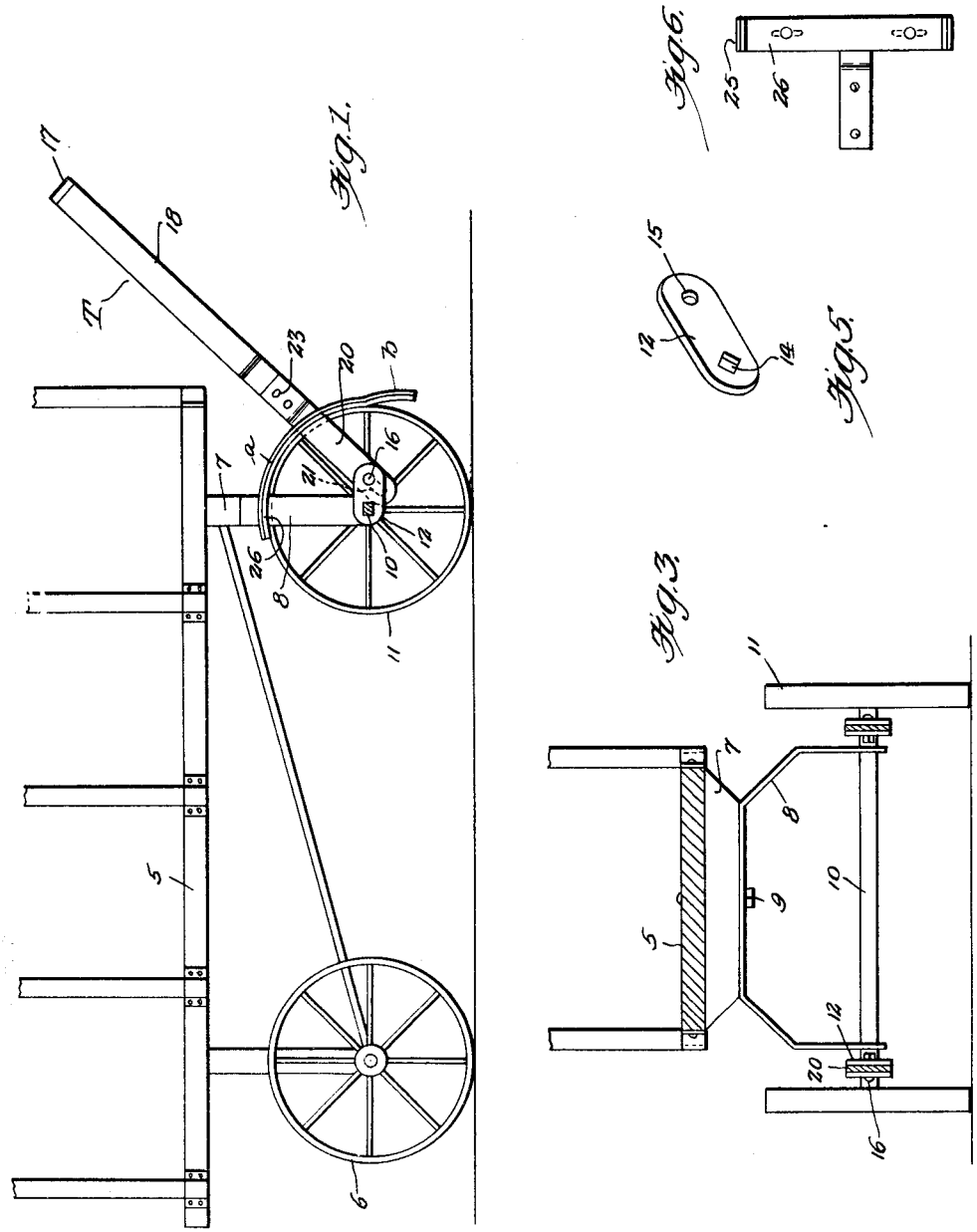

1,806,719

UNITED STATES PATENT OFFICE

EDWARD D. SULLIVAN, OF KLAMATH FALLS, OREGON

COMBINATION TONGUE AND BRAKE

Application filed January 4, 1929. Serial No. 330,390.

The present invention relates to a combination tongue and brake for baggage trucks and the like and has for its prime object to provide a tongue which may be placed in a raised position for parking the baggage truck or the like and when in such position will hold brakes on the front wheels of the truck.

Another very important object of the invention resides in the provision of a combined tongue and brake which when the tongue is free to swing downwardly will cause the application of the brake.

Another very important object of the invention resides in the provision of a device of this nature which insures the truck against running away on an incline when unattended.

A still further very important object of the invention resides in the provision of a combined tongue and brake structure which is simple, inexpensive to manufacture, easy to install, easy to manipulate, thoroughly efficient and reliable in use and operation, and otherwise well adapted to the purpose for which it is designed.

With the above and numerous other objects in view as will appear as the description proceeds, the invention resides in certain novel features of construction, and in the combination and arrangement of parts as will be hereinafter more fully described and claimed.

In the drawings:

Figure 1 is a side elevation of the truck embodying the features of my invention showing one of the front wheels removed, and showing the tongue in a raised or parking position, Figure 2 is a similar view of the truck showing the tongue in a lowered free position, Figure 3 is a transverse vertical section through the truck, Figure 4 is a top plan view thereof, Figure 5 is a perspective view of one of the plates, Figure 6 is a detail view of one of the brakes.

Referring to the drawings in detail it will be seen that I have illustrated a baggage truck by way of example but it is to be understood that any wheeled structure may be used in conjunction with my improved combination tongue and brake. In the present example the numeral 5 denotes the body of the truck mounted on a rear wheeled truck 6 and a front wheeled truck.

This front wheeled truck includes the brace 7 depending from the body 5 and having a substantially inverted U-shaped disk wheel bracket 8 pivotally mounted thereon by means of a bolt 9. An axle 10 is mounted in the extremities of the bracket or frame 8 and has wheels 11 journaled on the ends thereof.

Plates 12 are provided with square openings 14 to receive the axle 10 and circular openings 15 receive pivot bolts 16. The plates are arranged in two pairs one adjacent each end of the axle 10. A tongue is denoted generally by the letter T and is formed from a single strip of metal, in the present example, which is bent over upon itself to form a handle 17 of double ply, a shank 18 of double ply and a single ply arm 19 diverging rearwardly from the rear end of the shank 18 and terminating in spaced parallel extensions 20 pivoted between the forward ends of the plates 12 by means of said bolts 16.

The extremities of these extensions 20 are slotted longitudinally as is indicated at 21 in Figure 1 and the bolts 16 pass through these slots 21. On the arms 19 there are fixed brackets 22 by means of bolts 23 and these brackets merge into brake segments 25 each of which include a relatively large arcuate portion $a$ and a relatively small arcuate portion $b$.

Lining 26 is mounted on the band segment to bear against the peripheries of the wheels 11. From the above detailed description it will be seen that the tongue T may be raised and slid downwardly and rearwardly to engage the portions $a$ of the brake band segment 25 with the peripheries of the wheels 11 and the extremities of the extensions 21 engaged with the axle 10 to prevent the tongue from swinging downwardly so that the brake remaining on or set while the truck is parked.

Since, however, the truck is pulled along and the tongue released it will fall straight down to the position shown in Figure 2 at which time the small arcuate portion b will engage the peripheries of the wheel as will be quite apparent, since the bolts 16 are off center respective to the wheel.

It is thought that the construction, operation, utility and advantages of this invention will now be quite apparent to those skilled in this art without a more detailed description thereof.

The present embodiment of the invention has been disclosed in detail merely for the purposes of exemplification since in actual practice it attains the features of advantage enumerated as desirable in the statement of the invention and the above description.

It will be apparent that changes in the details of construction, and in the combination and arrangement of parts may be resorted to without departing from the spirit or scope of the invention as hereinafter claimed or sacrificing any of its advantages.

Having thus described my invention, what I claim as new is:

1. In combination, a truck including a pivoted front wheeled supporting structure, a tongue rockably mounted on said structure, brake band segments mounted on said tongue to engage with the peripheral face of the wheels of the structure, a rockable mounting for the tongue being in off center relation with respect to said wheel, and being of the pin and slot variety.

2. In combination, a truck including a pivoted front wheeled supporting structure, a tongue rockably mounted on said structure, brake band segments mounted on said tongue to engage with the peripheral face of the wheels of the structure, a rockable mounting for the tongue being in off center relation with respect to said wheel, and being of the pin and slot variety, and said segments each including a relatively large arcuate portion and a relatively small arcuate portion, the former being above the latter.

3. In combination with a front wheeled truck including an axle and a pair of wheels, plates arranged on the axle to project forwardly thereof and in two pairs one adjacent each wheel, a pair of arms having extensions formed with slotted extremities, bolts passing through the plates and the extremities, one extremity located between the pair of plates, a tongue on said arm, brackets on said arms, brake segments on said brackets for engaging the wheels when the tongue is in an upwardly and forwardly inclined position with the extremities engaging under the axle and further engage the wheels when the tongue is in the downwardly and forwardly inclined position and the extremities are free from the axle.

4. In combination with a front wheeled truck including an axle and a pair of wheels, plates arranged on the axle to project forwardly thereof and in two pairs one adjacent each wheel, a pair of arms having extensions formed with slotted extremities, bolts passing through the plates and the extremities, one extremity located between the pair of plates, a tongue on said arm, brackets on said arms, brake segments on said brackets for engaging the wheels when the tongue is in an upwardly and forwardly inclined position with the extremities engaging under the axle and further engage the wheels when the tongue is in the downwardly and forwardly inclined position and the extremities are free from the axle, said segments each including upper relatively large arcuate portions and a lower relatively small arcuate portions.

In testimony whereof I affix my signature.

EDWARD D. SULLIVAN.